Jan. 15, 1963   N. L. PARKS   3,073,467
DEMOUNTABLE CARGO BOX FOR VEHICLES
Filed Feb. 25, 1960   3 Sheets-Sheet 1
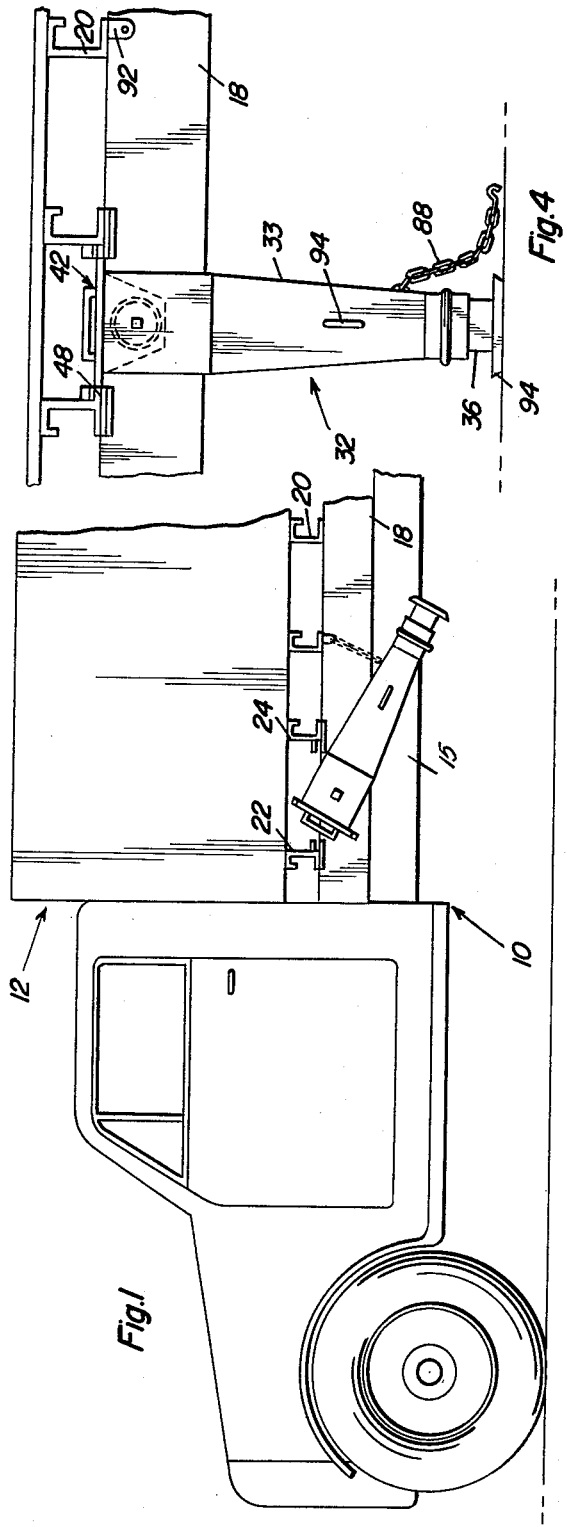
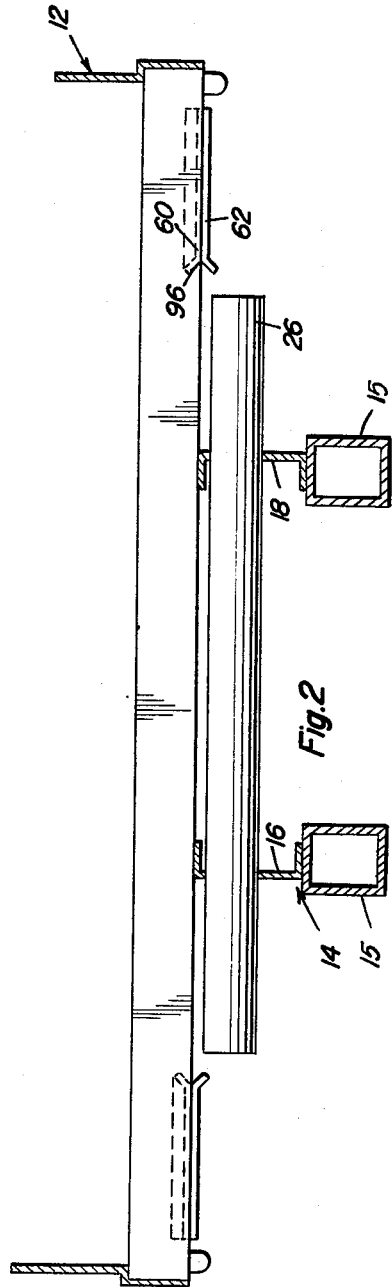
Noble L. Parks
INVENTOR.
BY *Clarence A. O'Brien*
*and Harvey B. Jacobson*
Attorneys

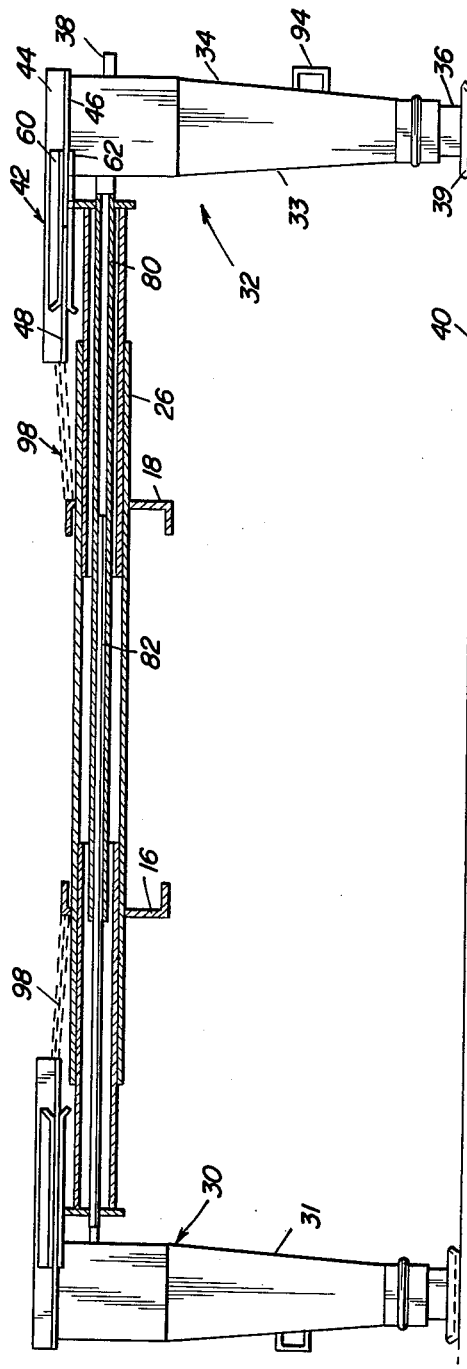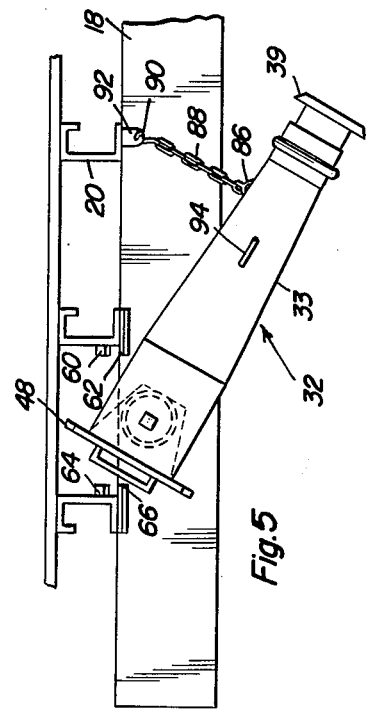

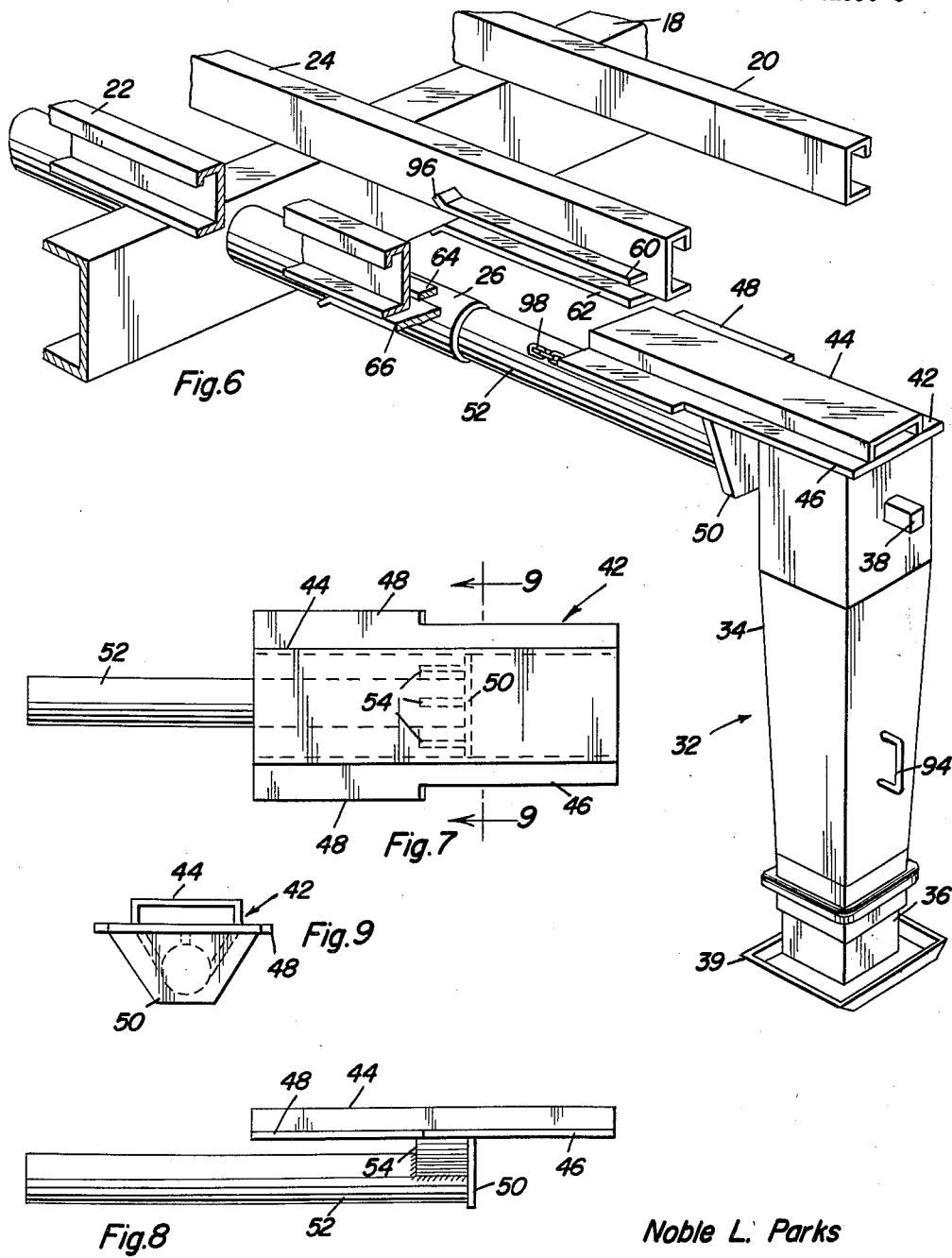

United States Patent Office 3,073,467
Patented Jan. 15, 1963

3,073,467
DEMOUNTABLE CARGO BOX FOR VEHICLES
Noble L. Parks, Meridian, Miss., assignor of one-third to R. A. Goodling and one-third to W. L. Runge, both of Meridian, Miss., and one-third to E. David Dryden, Amory, Miss.
Filed Feb. 25, 1960, Ser. No. 10,906
8 Claims. (Cl. 214—515)

This invention relates generally to a demountable cargo box for vehicles and more particularly to a novel front leg assembly therefor.

The invention herein represents an improvement over applicant's application U.S. Serial No. 735,320, filed May 14, 1958, and now Patent No. 2,925,930. The application referred to relates to cargo boxes for vehicles and introduces novel support means for cargo boxes. As pointed out in the above noted application, a removable truck body is provided with means for facilitating the mounting of the truck body upon a chassis of a vehicle. Also, means are set forth for removing the body from the vehicle chassis so as to greatly facilitate and render more economical the use of a single truck with a plurality of interchangeable removable bodies or cargo boxes.

The present invention relates solely to an improved front leg assembly for demountable cargo boxes of the part disclosed in U.S. application Serial No. 735,320 and now Patent No. 2,925,930. Inasmuch as applicant fully set forth therein the rear leg assembly structure and the means utilized for securing the cargo box to a vehicle, the discussion herein will be principally restricted to the novel front leg assembly construction.

The principal object of this invention is therefore to provide a novel front leg assembly for a demountable cargo box which is simple in construction and accordingly is remarkably easy to utilize and operate and which may be manufactured and installed at a relatively low expense.

It is more particularly an object of this invention to provide a novel front leg assembly for demountable cargo boxes wherein the base of the box carries movable supporting units which may be retained in either a supporting or a carrying position. To enable a truck chassis to be backed under the supported cargo box, it is necessary to locate the front supports remote from the center of the box so that the truck chassis may be backed under the box base. However, when the box is being carried by the truck, it is desirable to move the support units toward the center of the box to reduce the width of the truck and box.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary elevational side view of a portion of a truck chassis illustrating a portion of a cargo box mounted thereon and showing the front leg assembly in carrying position;

FIGURE 2 is a front elevational view of a portion of a cargo box, showing parts in section, with the movable support units removed from the box;

FIGURE 3 is a front elevational view, parts being shown in section, of the box front leg assembly and illustrating particularly the carrying tube and structural details of each of the support units showing the support units in supporting position;

FIGURE 4 is a fragmentary elevational side view of a portion of the cargo box showing the support unit in support position;

FIGURE 5 is a fragmentary elevational side view of a portion of the cargo box showing the support unit in carrying position;

FIGURE 6 is a perspective partially disassembled view showing the relationship between the base and elements of the front leg assembly;

FIGURE 7 is an elevational plan view of the support plate and rotating tube of a support unit;

FIGURE 8 is an elevational side view of a support plate showing the rotating tube secured thereto; and FIGURE 9 is a sectional view taken substantially along the plane 9—9 of FIGURE 7.

With continuing reference to the drawings, attention is initially called to FIGURE 1 wherein numeral 10 generally represents a vehicle of any conventional type upon which the cargo box 12 is removably carried. The demountable cargo box includes a supporting framework or base designated generally by the numeral 14 and includes a pair of longitudinally extending side frame members 16 and 18 which are preferably channel-shaped. Transverse stringers 20, 22 and 24 are attached between the frame members 16 and 18 and extend therebeyond. The transverse stringers may be any suitable structural members, as for instance channels or I-beams. Attention is particularly called to stringers 22 and 24 which indicate particularly the initial two stringers on the side frame members 16 and 18.

Extending between the side frame members 16 and 18 and extending therebeyond, centrally of the stringers 22 and 24, is a carrying tube 26. The carrying tube 26 must be formed of relatively strong material and has a finished inner circular surface. In order to support the cargo box 12 when it is not being carried by the vehicle, a pair of movable support units 30 and 32 are provided. Each of the support units 30 and 32 includes an extensible jack stand 31 and 33 having an inner section 36 extensible from the section 34. A square stub shaft 38 is provided and operatively connected with gearing within upper section 34 for extending section 36 therefrom. Section 36 is provided with a foot plate 39 adapted to engage the ground surface 40. A support plate 42 having a channel element 44 secured thereto overlies the section 34 of the jack stand. Support plate 42 is provided with a reduced end 46 and an enlarged end 48. A flat member 50 extends vertically downward from the support plate 42. A rotating tube 52 of a smaller diameter than the carrying tube 26 is secured to the member 50 by radially extending braces 54. As is particularly noted in FIGURES 3 and 6, the rotating tube 52 is received in the carrying tube 26 for slidable and rotatable movement with respect thereto.

Spaced upper and lower guides 60 and 62 are fixed to the transverse stringer 24 while spaced upper and lower guides 64 and 66 are fixed to the transverse stringer 22. The enlarged portion 48 of the support plate 42 is receivable between the guide pairs 60 and 62, and 64 and 66, as indicated in FIGURES 3 and 4. It will be apparent that the legs or jack stands 31 and 33 respectively of the support units 30 and 32 will therefore support the cargo box 12 when the enlarged portion 48 of the support plate 42 is received between the guides on the stringers 24 and 22. When in the support position, as illustrated best in FIGURES 3 and 4, the support units 30 and 32 are remote from the center of the cargo box 12 and accordingly the vehicle 10 may be backed therebeneath so as to enable the cargo box 12 to be secured to the vehicle frame members 15.

The stub shaft 38 is connected to a square outer shaft 80 which telescopically receives a square inner shaft 82 operatively connected to the jack stand 31. The shafts 80 and 82 are slidably associated. Accordingly, by rotating stub shaft 38, as for instance with a wrench, shaft 82 will be rotated to operate jack stand 31. When the vehicle 10 is backed beneath the cargo box 12, it is merely necessary to then operate the stub shaft 38 to shorten the jack stands 31 and 33 to bring the weight of the cargo box 12 upon the vehicle frame 15.

In order to move the support units 30 and 32 to the carrying position as illustrated in FIGURES 1 and 5, it is necessary to push the support units toward the longitudinal center of the cargo box 12 or rather toward the frame members 16 and 18. By so doing, the enlarged portion 48 of the support plate 42 will emerge from between the guides 60 and 62, and 64 and 66. With nothing to impede the rotational movement of the enlarged portion 48 of the support plate 42, the support units 30 and 32 may be rotated to the position illustrated in FIGURES 1 and 5 with the rotating tube 52 turning within the carrying tube 26. An eye 86 is provided on each of the jack stands 31 and 33 and a chain 88 having a hook 90 terminally secured thereto is attached to the eye 86. An eye 92 for receiving the hook 90 is secured to a stringer 20 or a side frame member 16 or 18 for retaining the jack stand 31 or 33 in the rotated or carried position.

Of course, in order to move the support units 30 and 32 from the carrying position of FIGURES 1 and 5 to the support position of FIGURES 3, 4 and 6, it is initially necessary to disengage the hook 90 and eye 92 so as to allow the jack stands 31 and 33 to assume a vertical position. Then, by utilizing handles 94 provided on each of the jack stands, the support units 30 and 32 may be pulled outwardly, that is away from the frame members 16 and 18. By so doing, the enlarged portion 48 of the support plates 42 pass between the guides 60 and 62 and 64 and 66. The guides are each flared outwardly at their inner ends as at 96 to facilitate entrance of the enlarged portion 48 of the support plate 42. A chain 98 is fastened between the support plate 42 and the frame members 16 and 18 respectively to limit the outward sliding movement of the support units 30 and 32. The rotating tube 52 of course slides outwardly within the carrying tube 26. When the support units 30 and 32 have been properly slid outwardly and have assumed the vertical position, a wrench may be utilized on the stub shaft 38 to extend the jack stands 31 and 33 so as to cause the weight of the cargo box 12 to be supported on the jack stands 31 and 33 as the weight is transmitted by the guides to the support plate 42.

It will be appreciated that the carrying tube 26 must be of sufficient strength to support the weight of the support units 30 and 32 only. The entire weight of the cargo box 12 is not impressed on the carrying tube 26 inasmuch as this weight is transmitted through the guides to the support plate and the jack stand. The novel front leg assembly described herein represents an improvement over applicant's application U.S. Application Serial No. 735,320 and now Patent No. 2,925,930 inasmuch as the new construction enables more maneuverability under hazardous conditions such as high curbs, railroad crossings etc. and reduces the danger of breaking or damaging the front jack stands.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is a follows:

1. A front leg assembly for a demountable cargo box for vehicles having a base with a box mounted thereon comprising a carrying tube affixed to said base and a pair of support units movable with respect thereto, each of said support units including a leg, each of said legs having secured thereto a rotating tube, each of said rotating tubes axially and slidably and rotatably received in said carrying tube, and cooperating with said support means other than said tubes carried by said base and legs for supporting said cargo box on said legs, said support means transmitting substantially the entire weight of said box and base directly to said legs thereby preventing said weight from being carried by the tubes, said support means including two pairs of vertically spaced guides for each leg secured to said base and a support plate fixedly attached to each of said legs, said plate slidably receivable between each pair of said spaced guides whereby said box may be supported on said plates and said plates are prevented from tilting about any horizontal axis by said guides.

2. A front leg assembly for a demountable cargo box for vehicles having a base with a box mounted thereon comprising a carrying tube fixed to said base and a pair of support units movable with respect thereto, each of said support units including a leg, each of said legs having secured thereto a rotating tube, each of said rotating tubes axially slidably and rotatably received in said carrying tube, and cooperating support means other than said tubes carried by said base and said legs for supporting said cargo box on said legs, each of said legs comprising an extensible jack stand and means operatively connected to each of said legs passing through said tubes connecting said jack stands for extensible movement, said last named means including a pair of telescoped non-circular shafts.

3. A demountable cargo box for vehicles comprising a base having a box mounted thereon, said base including a pair of spaced longitudinally extending side frame members, transverse stringers attached across and extending beyond said frame members, a carrying tube fixed between said frame members and a pair of support units movably carried by said carrying tube, each of said support units including a leg, each of said legs having secured thereto a rotating tube, each of said rotating tubes slidably and rotatably received in said carrying tube, and cooperating support means in addition to said tubes carried by said base and said legs for supporting said cargo box on said legs, said support means including guide channels secured to opposite sides of said base, members secured to said legs horizontally slidably guided within said guide channels.

4. A demountable cargo box for vehicles comprising a base having a box mounted thereon, said base including a pair of spaced longitudinally extending side frame members, transverse stringers attached across and extending beyond said frame members, a carrying tube fixed between said frame members and a pair of support units movably carried by said carrying tube, each of said support units including a leg, each of said legs having secured thereto a rotating tube, each of said rotating tubes slidably and rotatably received in said carrying tube, and cooperating support means in addition to said tubes carried by said base and said legs for supporting said cargo box on said legs, said support means including spaced guides terminally secured to said transverse stringers remote from said frame members and a support plate fixedly attached to each of said legs, said plate slidably receivable between said spaced guides whereby said box may be supported on said plates so as to prevent damage to said tubes, said guides secured to said stringers remote from said frame members whereby said legs may in the space defined rotate between said guides and said frame members.

5. The combination of claim 4 wherein each of said legs is an extensible jack stand and means operatively connected to each of said legs passing through said rotating and carrying tubes connecting said jack stands for extensible movement.

6. A demountable cargo box for vehicles comprising a base having a box mounted thereon, said base including a pair of spaced longitudinally extending side frame members, transverse stringers attached across and extending beyond said frame members, a carrying tube fixed between said frame members and a pair of support units movably carried by said carrying tube, each of said support units including a leg, each of said legs having secured thereto a rotating tube, each of said rotating tubes slidably and rotatably received in said carrying tube, and cooperating support means in addition to said tubes carried by said base and said legs for supporting said cargo box on said legs, each of said legs comprising an extensible jack stand and means operatively connected to each of said legs passing through said tubes connecting said jack stands for extensible movement, said last named means including a pair of telescoped non-circular shafts.

7. The combination of claim 3 wherein cooperating stop means are secured between said base and each of said support units for limiting slidable axial movement between said rotating tube and said carrying tube.

8. The combination of claim 3 wherein U-shaped handles are provided on each of said support units for facilitating slidable movement of said rotating tube in said carrying tube.

References Cited in the file of this patent

UNITED STATES PATENTS

| | | |
|---|---|---|
| 1,303,854 | Clark | May 20, 1919 |
| 2,665,938 | McCrossen | Jan. 12, 1954 |
| 2,811,386 | Shaw | Oct. 29, 1957 |
| 2,868,401 | Lelois | Jan. 13, 1959 |
| 2,921,825 | Spiegel | Jan. 19, 1960 |
| 2,925,930 | Parks | Feb. 23, 1960 |
| 2,936,914 | Shaw | May 17, 1960 |